(12) United States Patent
Orban et al.

(10) Patent No.: US 7,614,296 B2
(45) Date of Patent: Nov. 10, 2009

(54) METHOD AND DEVICE FOR FLUID FLOW PARAMETERS DETERMINATION

(75) Inventors: Jacques Orban, Moscow (RU); Stanislav N. Veritchev, Nizhny Novgorod (RU); Evgeny M. Sviridov, Moscow (RU); Pavel T. Zubkov, Tyumen (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 162 days.

(21) Appl. No.: 11/810,712

(22) Filed: Jun. 7, 2007

(65) Prior Publication Data

US 2007/0295081 A1    Dec. 27, 2007

(30) Foreign Application Priority Data

Jun. 9, 2006    (RU) ............................... 2006120126

(51) Int. Cl.
*G01F 1/68*    (2006.01)
(52) U.S. Cl. ............... 73/204.15; 73/204.16; 73/204.19
(58) Field of Classification Search ............... 73/204.15, 73/861, 204.16, 204.19
See application file for complete search history.

(56) References Cited

U.S. PATENT DOCUMENTS

| 7,207,046 | B1 | 4/2007 | Van Gerrevink |
| 7,228,733 | B2 | 6/2007 | Seki et al. |

FOREIGN PATENT DOCUMENTS

| RU | 2263210 | 10/2005 |
| RU | 2122724 | 11/2007 |
| SU | 1138487 | 2/1985 |
| SU | 1188583 | 10/1985 |
| SU | 1645902 | 4/1991 |

*Primary Examiner*—Andre J Allen
(74) *Attorney, Agent, or Firm*—Kevin Brayton McGoff; Tim Curington; Zhanna Prokofieva

(57) ABSTRACT

A method and device for a liquid media parameters determination, wherein an extended heater oriented along the fluid flow is installed in the fluid flow. Fluid flow temperature is measured. The heater is heated up and the temperatures at the interfaces "heater front surface–flow zone" and "heater rear surface–flow zone" are measured; for the both interfaces, measured values are used for calculating temperature difference between the said heater and the flow, while the water-to-oil relationship is determined through calculations by using either mathematical or graphic relationships. The device for determining the parameters of fluid flow comprising a heater, characterized in that the heater has an extended shape and is oriented along the fluid flow direction, with two thermal sensors located at the opposite ends of the heater, which are capable of transmitting measured data remotely.

17 Claims, 2 Drawing Sheets

METHOD AND DEVICE FOR FLUID FLOW PARAMETERS DETERMINATION

TECHNICAL FIELD

The present application relates to a method and device for a liquid media parameters determination, which can be applied for determining the oil-water mix flow parameters, preferably, during determination of the flow velocity, temperature and oil-to-water ratio in the flow.

BACKGROUND

SU, certificate of authorship 1645902, relates to a method for determining a liquid or gas flow velocity. In accordance with that method, an overheated sensor of a heat-loss anemometer is calibrated beforehand at a maximum and a minimum flow velocities and the heat-loss anemometer's output signal is then recorded to be used for determination of the target flow velocity. To increase the measurement accuracy, the preliminary calibration of the heat-loss anemometer sensor can be performed for maximum and minimum flow velocities at different flow temperatures.

One of the disadvantages associated with that design is a narrow field of application in connection with flow velocity determination.

RU, patent 2263210 relates to pressure profile determination in wellbores, flow lines and pipes that carry single phase or multi-phase fluids. In that case, a fluid flow is temporarily stopped (partly or completely) by using a rapid-acting gate, and a pressure at a point located at a small distance from the gate in the counter-flow direction is continuously recorded; then the relations known from the Darcy-Weisbakh friction loss equation are applied for determining the desired parameter of the flow.

One of the disadvantages associated with that design is a narrow field of application in connection with flow pressure profile determination.

SU, certificate of authorship 1138487 relates to a method of a fluid flow velocity measurement in a well annulus. That method calls for wellbore section heating by a heater, and the determination of the heat exchange intensity between the in-casing liquid and the annulus medium; in so doing a fixed liquid volume in the casing is heated while maintaining a constant temperature difference between the heated liquid and the annulus medium; the heater power consumption value is used for the flow velocity determination.

RU, patent 2122724 relates to a device for measuring the composition of a fluid passing through a pressure pipe. The device includes a pipe that can be fitted to the pressure pipe to allow the fluid flow passing through the pipe, a radiation source located in a way that allows the radiation passing across the pipe wall and a fluid flow, a radiation detector for detecting radiation passing through the pipe wall and a fluid flow, and a signal-generating unit that generates signals corresponding to the radiation to be detected by the detector. The detector is a solid-body detector structure, which is equipped with at least two radiation-detecting surfaces, and a filter, which is located between the radiation source and the first detecting surface; the said filter traps the low-energy radiation and passes through the high-energy radiation; the pipe wall comprises a fiber-armored resins.

SU, certificate of authorship 1188583 relates to a method and device for liquid phase density determination of oil saturated with gas and water, can be recognized as the closest analogs of the claimed technical decision. In the method, a liquid phase of gas-and-water-saturated oil passes through a flow-through measurement chamber of a pseudo-closed volume; temperature, pressure and density values of a liquid phase in the measurement chamber are measured; the volume of the said measurement chamber is then changed isometrically at constant frequency and amplitude to preclude gas dissolution in the liquid phase; then, the volume of the measurement chamber and the amplitude of the liquid phase pressure pulsation are measured, and thereafter the target parameter is calculated. The device used for the method implementation comprises a flow-through pseudo-closed measurement chamber, mechanism for pressure pulsation excitation in the measurement chamber, as well as a liquid phase average density transducer, a pressure transducer and a temperature transducer all connected to the computing unit.

SUMMARY

A method of fluid flow parameter determination comprising: measurement of a temperature, wherein an extended heater oriented along the fluid flow is installed in the fluid flow, fluid flow temperature is measured, the heater is heated up and the temperatures at the separation boundary "heater front surface–flow zone" and "heater rear surface–flow zone" are measured; for the both separation boundaries, measured values are applied to calculate temperature difference between the said heater and the flow, while the water-to-oil relationship is determined through calculations.

DETAILED DESCRIPTION

Figure 1:
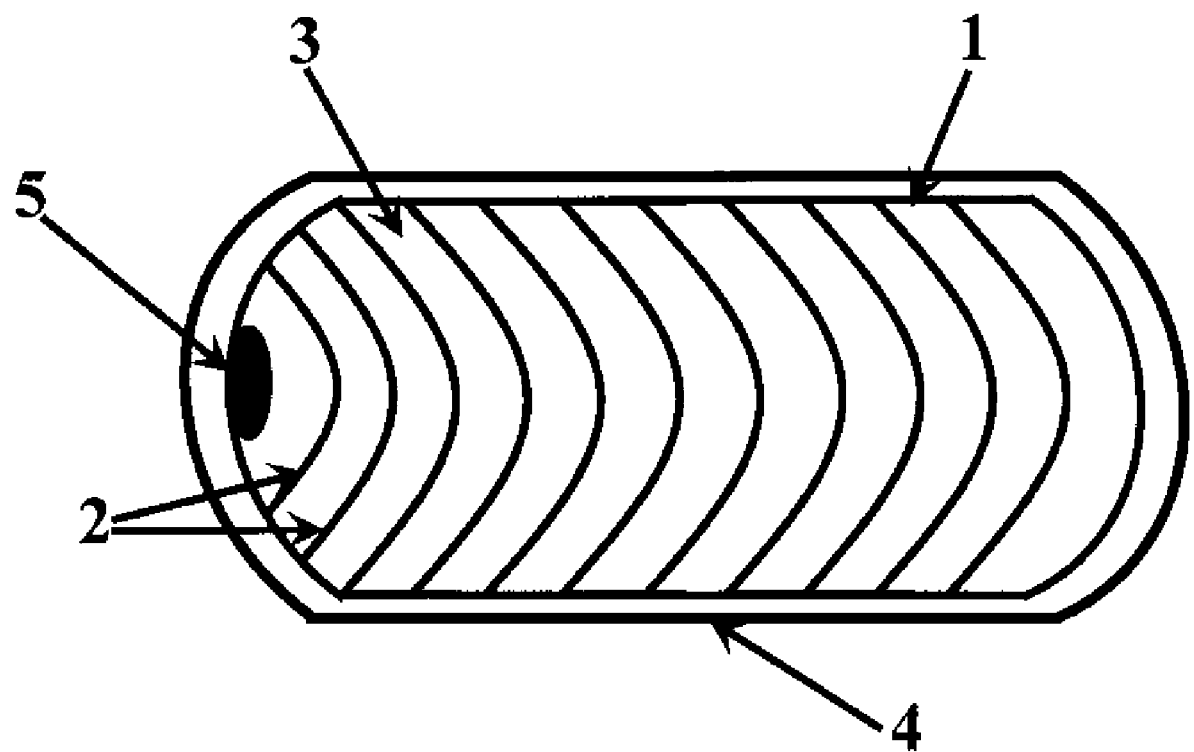
FIG. 1 shows an embodiment of the device.

The present application addresses many of the issues noted above. Some of those are addressed through the implementation of the technical decision discussed in connection with certain embodiments herein, e.g., the optimization of the fluid-pumping equipment layout and the simplification of the fluid flow parameters determination procedure (oil-to-water ratio and flow rate).

According to an embodiment, it is desired to use a method and device for fluid flow parameters determination.

As per an embodiment of a method, an extended heater oriented along the fluid flow is installed in the fluid flow; fluid flow temperature is measured, the heater is heated up and the temperatures at the interfaces "heater front surface–flow zone" and "heater rear surface–flow zone" are measured; for the both interfaces, measured values are used for calculating temperature difference between the said heater and the flow, while the water-to-oil relationship is determined through calculations (using either mathematical or graphic relationships).

To implement the said method, according to an embodiment, it is proposed to use a device for fluid flow parameter determination that comprises an extended-shape heater with two thermal sensors located at the opposite ends of the heater, which are capable to transmit measured data remotely. The third thermal sensor can additionally be installed for measuring fluid flow temperature beyond the heater's area of operation. The third thermal sensor is used if a continuous monitoring of fluid flow parameters is required, when it's impossible to use the thermal sensors mounted at the heater for initial flow temperature measurement, because the heater during the initial flow temperature measurement process is off.

In one embodiment of the proposed device, the heater has an extended casing made of a heat-insulating material with a conductor coiled up on heat-insulating material surface, with the leads of the said conductor allowing its connection to a power supply source, with the conductor layer covered with a heat-transferring insulating coating, with thermal sensors mounted at the opposite edges of the casing. Preferably, the conductor is fixed in a spiral groove made in the casing surface. In the second embodiment of the proposed device, the heater has an extended casing made of a ferromagnetic material, with a laminated ferromagnetic core located inside the casing, on which an electric conductor is coiled up, with the leads of the said electric conductor allowing its connection to a power supply source; the casing edges are covered with ferromagnetic covers and thermal sensors are fixed to their outer surfaces, with ferromagnetic connecting elements installed between the said ferromagnetic covers and the laminated ferromagnetic core. In the third embodiment of the proposed device, the heater has an extended tubular casing made of a ferromagnetic material, with a ferromagnetic core located inside the casing on which an electric conductor is coiled up, with the leads of the said electric conductor allowing its connection to a power supply source; the casing edges are covered with ferromagnetic covers and thermal sensors are fixed to their outer surfaces, with ferromagnetic connecting elements installed between the said ferromagnetic covers and the laminated ferromagnetic core. In so doing it is preferable to make the casing from a set of ferromagnetic rings between which the heat-insulating rings are installed, with the width of heat-insulating rings is lower than the width of ferromagnetic rings. In the next embodiment of the proposed device, the heater has an extended casing whose internal volume is divided by a heat-insulating partition, with a heat-conducting core placed in each compartment formed by this partition, with an electric conductor coiled up on the heat-conducting core surface, and heat-conducting casings, on which thermal sensors are fixed, mounted at the casing edge surfaces.

The present application is based on an experimentally discovered phenomenon of dependence of a thermal flow from the surface of the heater placed in the fluid flow vs. the fluid composition and fluid flow rate (flow velocity) as well as the flow perfection degree. A heat transfer coefficient of the surface of the heater placed in a liquid media (fluid) is inversely proportional to the thickness of the thermal boundary layer. During a flow about a cylinder (a preferable shape of the heater casing), the thickness of a boundary layer in the front point (area of high local Reynolds numbers) is known to be much less than at the cylinder's rear part (stagnant zone characterized by low local Reynolds numbers (Re)). Hence the maximum heat withdrawal (and, therefore, a temperature drop) is found at or near the front point. That results in a significant difference in readings observed at a device recording data coming from thermal sensors. By resolving an inverse problem, it's possible to determine both the Reynolds number characterizing the fluid flow rate, and the Prandtl number (Pr) characterizing its composition by heat removal difference between the front and rear heater surfaces.

Heat transfer coefficient is defined as $\alpha = q/\Delta T$, where q is the heat flow, $$\Delta T \equiv T_{heater} - T_{incoming \atop flow} \text{ – temperature difference.}$$

Let's assume that $\delta_T$ is a thickness of thermal boundary layer, then a thermal flow can be evaluated as per formula:

$$q \sim k \frac{\Delta T}{\delta_T},$$

where k is heat-conductivity coefficient.

Thus, heat transfer coefficient can be assessed by the formula:

$$\alpha \sim k/\delta_t$$

The difference in the temperature conditions between two points of the fluid flow can be assessed as follows:

$$\alpha_A/\alpha_B \sim \delta_T|_B/\delta_T|_A$$

In practice, to simplify calculations, the $Q=f(\Delta T)$, $\beta=g(\Delta T)$ curves are plotted for using for determining the flow rate (Q) and oil content $\beta$. Preferably, when plotting the above-mentioned curve, the characteristics of oil included in the fluid flow composition, are taken into consideration.

FIG. 1 shows an embodiment where a heater has an extended casing 1 made of a heat-insulating material with a conductor 2 coiled up on heat-insulating material surface, preferably located in a spiral groove 3, whose leads allow its connection to a power supply source, with the conductor layer covered with a heat-transferring insulating coating 4, with thermal sensors 5 mounted at the opposite edges of the casing, the said casing can be made of a highly heat-resistant material (plastic or ceramics). The design ensures a uniform thermal flow over the entire surface of the said heater with the whole thermal flow going outside, which allows a rather accurate determination of the fluid parameters in question. However, the risk of the surface layer plastic deformation and erosion arises during its operation in wells.

Figure 2:
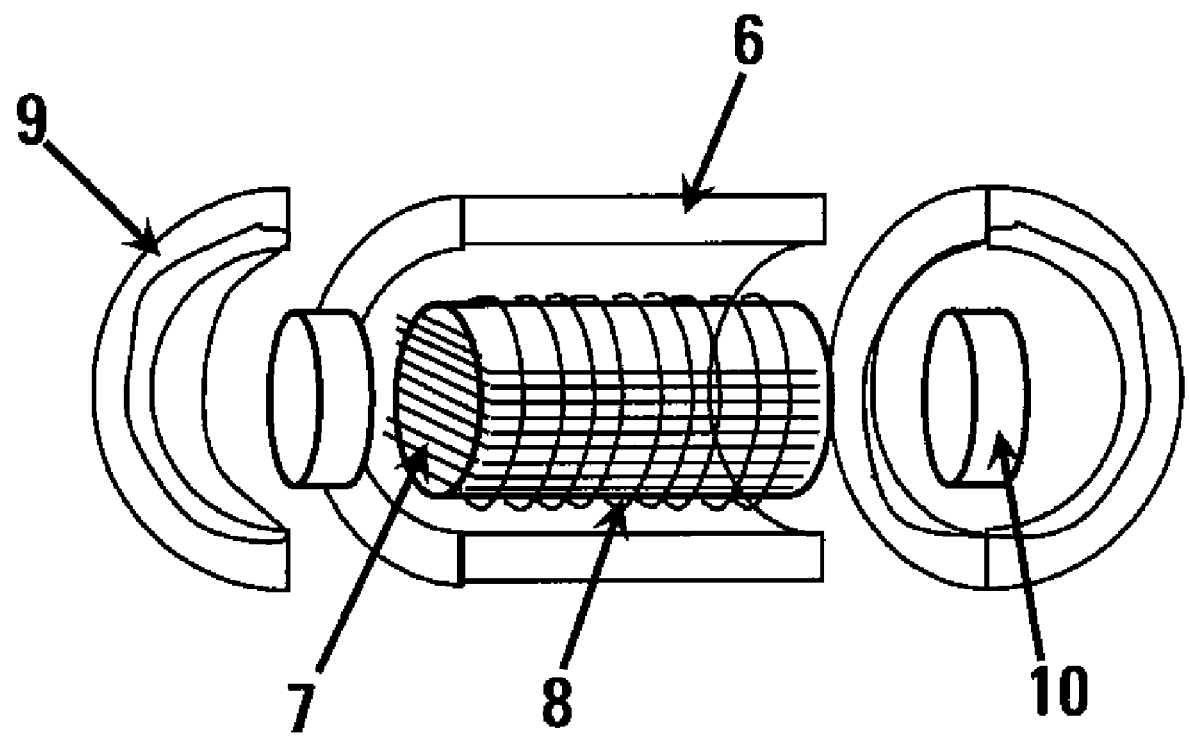
FIG. 2 shows another embodiment of the device.

FIG. 2 shows an embodiment where a heater has an extended tubular casing 6 made of a ferromagnetic material, with a laminated ferromagnetic core 7 located inside the casing, on which an electric conductor 8 is coiled up, with the leads of the said electric conductor allowing its connection to a power supply source; the casing edges are covered with ferromagnetic covers 9 and thermal sensors are fixed to their outer surfaces, with ferromagnetic connecting elements 10 installed between the said ferromagnetic covers and the laminated ferromagnetic core, the thermal effect is developed by eddy currents in the outer layer. The internal coiled conductor is intended for passing an alternating current, which produces a magnetic flux in the central laminated ferromagnetic core. The design of the said core (practice of laminated core fabrication for voltage converters) ensures that induced eddy currents are weak and thus provides low heat generation in the core. The magnetic circuit comprises a laminated central core, two semi-spheres at extreme points and a hollow external tube. Those components can be made of a ferromagnetic material with a high magnetic permeability, which ensures the generation of the intensive magnetic flux. In such designs, currents form a circuit in the cylinder casing, which uniformly heats the cylinder.

According to an embodiment of the device, a strong induced current that generates a significant amount of heat circulates in the tube. To avoid magnetic saturation, a cross-section area of the casing metal should be comparable with the internal core's cross-section area. To reduce axial thermal flow, it is advisable to make the outer cylindrical casing as a set of metal and heat-insulating rings.

According to another embodiment of the device, the heating takes place only at two extreme points. Any method can be employed for the core heating (either the inductive effect or resistance heating); in this the heat transfer from one part of the device to the other is minimized.

Generally, in connection with embodiments, when determining, in particular, the fluid flow parameters in wells, the sequence of operations is as follows:
1. The device is installed in the pipe center.
2. Fluid temperature $T_{well}$ is measured (it is a temperature at any point of the device when the heater is turned off).
3. The heater is turned on at a specified power for the specified time $\tau_{heat}$. This time period is determined experimentally and is defined as a maximum time over which a stationary temperature distribution in the device settles.
4. Temperatures at the heater front and rear surfaces ($T_f$ and $T_b$, respectively) are measured.
5. The difference between the temperatures at the device and well liquid temperatures is calculated:

$\Delta T_f = T_f - T_{well}, \Delta T_b = T_b - T_{well}$.

6. If $\Delta T_f$ is less than the preset value (measurement error), than go back to Steps 3-6 and increase the power until $\Delta T_f$ exceeds the minimum permissible value.
7. Using the reference flow vs. temperature difference ($\Delta T_f$, $\Delta T_b$) curve for clean water and clean oil, calculate the following values:
   $Q_{w(f)}$—clean water flow rate corresponding to the temperature difference $\Delta T_f$,
   $Q_{w(b)}$—clean water flow rate corresponding to the temperature difference $\Delta T_b$,
   $Q_{o(f)}$—clean oil flow rate corresponding to the temperature difference $\Delta T_f$,
   $Q_{o(b)}$—clean oil flow rate corresponding to the temperature difference $\Delta T_b$,
8. If $Q_{w(f)} = Q_{w(b)}$, than the well fluid is clean water,
   If $Q_{o(f)} = Q_{o(b)}$, than the well fluid is clean oil,
   If $Q_{o(f)} \neq Q_{o(b)}$ и $Q_{w(f)} \neq Q_{w(b)}$, than the well fluid is a mixture of water and oil.
9. If the well fluid is a mixture, than either a graphic method (family of experimental curves corresponding to the mixture), or mathematic relationships are applied for determination of the flow rate and oil-to-water ratio; e.g. the following simplified formulas can be used:

$$\beta = \left| \frac{Q_{w(b)} - Q_{w(f)}}{(Q_{o(f)} - Q_{w(f)}) - (Q_{o(b)} - Q_{w(b)})} \right|$$

$$Q = \left| \frac{Q_{o(f)} Q_{w(f)} - Q_{o(b)} Q_{w(b)}}{(Q_{o(f)} - Q_{w(f)}) - (Q_{o(b)} - Q_{w(b)})} \right|$$

The application of the proposed technical decision ensures prompt monitoring of the fluid flow parameters that allows us to optimize the downhole equipment layout as well as conditions of the fluid flow transfer through pipelines.

The invention claimed is:

1. A method of fluid flow parameter determination comprising:
    installing an extended heater in the fluid flow,
    measuring temperature of the fluid flow,
    turning on and heating the heater to increase temperatures at opposite ends of the heater;
    measuring a temperature at each opposite end of the heater and transmitting the measured temperatures remotely
    applying the measured temperatures to calculate temperature difference between each end of the heater.

2. The method, as claimed in claim 1, wherein mathematical relationships are applied for calculations.

3. The method, as claimed in claim 1, wherein graphic relationships are applied for calculations.

4. A device for determining the parameters of fluid flow comprising:
    a heater, wherein the heater has an extended shape and is oriented along the fluid flow direction, with two thermal sensors located at the opposite ends of the heater, which are capable of transmitting measured data remotely.

5. The device, as claimed in claim 4, wherein:
    the device additionally contains a third thermal sensor which allows fluid flow temperature determination beyond the heater's area of operation.

6. The device, as claimed in claim 4, wherein:
    the heater has an extended casing made of a heat-insulating material with a conductor coiled up on the heat-insulating material surface, with the leads of the said conductor allowing its connection to a power supply source, with the conductor layer covered with a heat-transferring insulating coating, with thermal sensors mounted at the opposite edges of the casing.

7. The device, as claimed in claim 6, wherein:
    the conductor is fixed in a spiral groove made in the casing surface.

8. The device, as claimed in claim 4, wherein:
    the heater has an extended tubular casing made of a ferromagnetic material, with a laminated ferromagnetic core located inside the casing on which an electric conductor is coiled up, with the leads of the said electric conductor allowing its connection to a power supply source; the casing edges are covered with ferromagnetic covers and thermal sensors are fixed to their outer surface, with ferromagnetic connecting elements installed between the said ferromagnetic covers and the laminated ferromagnetic core.

9. The device, as claimed in claim 4, wherein:
    the heater has an extended tubular casing made of a ferromagnetic material, with a ferromagnetic core located inside the casing on which an electric conductor is coiled up, with the leads of the said electric conductor allowing its connection to a power supply source; the casing edges are covered with ferromagnetic covers and thermal sensors are fixed to their outer surface, with ferromagnetic connecting elements installed between the said ferromagnetic covers and the laminated ferromagnetic core.

10. The device, as claimed in claim 9, wherein:
    the casing is made as a set of ferromagnetic rings between which the heat-insulating rings are installed with the width of the heat-insulating rings less than the width of the ferromagnetic rings.

11. The device, as claimed in claim 4, wherein:
    the heater has an extended casing whose internal volume is divided by a heat-insulating partition, with a heat-conducting core placed in each compartment formed by this partition, with an electric conductor coiled up on the heat-conducting core surface, and with heat-conducting casings, on which thermal sensors are fixed, mounted at the casing end surfaces.

12. The method of claim 1, comprising: determining the flow rate through calculations.

13. The method of claim 1, comprising: determining the water-to-oil ration through calculations.

14. The method, as claimed in claim 12, wherein mathematical relationships are applied for the calculations.

15. The method, as claimed in claim 12, wherein graphic relationships are applied for the calculations.

16. The method, as claimed in claim 13, wherein mathematical relationships are applied for the calculations.

17. The method, as claimed in claim 13, wherein graphic relationships are applied for the calculations.

* * * * *